April 19, 1966 R. H. PINTELL 3,247,476
ELECTROMAGNETIC DEVICE
Filed June 14, 1961
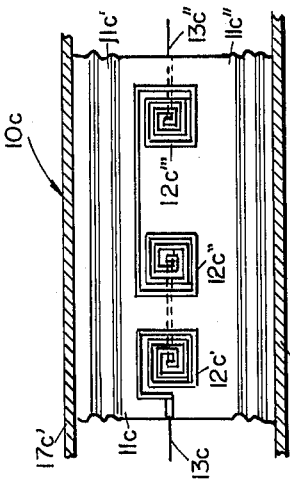
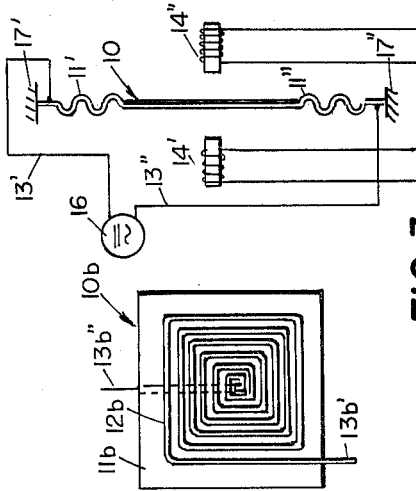
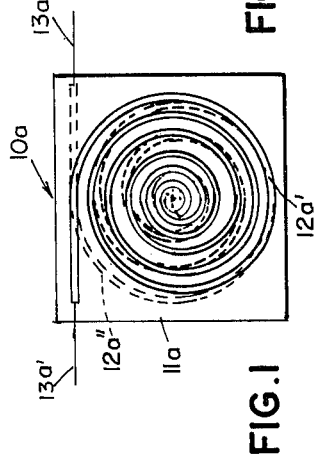
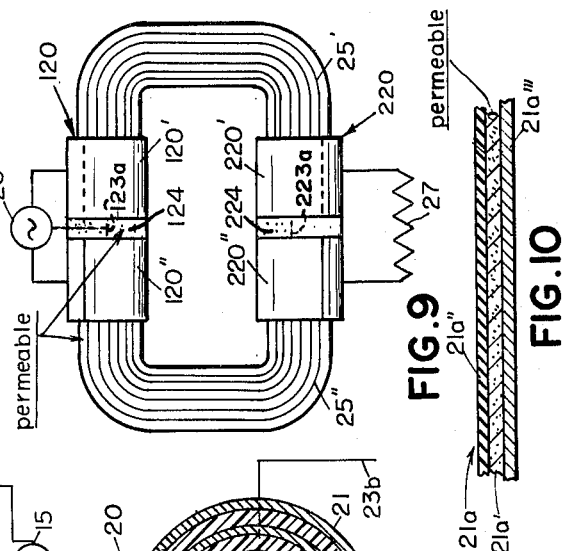
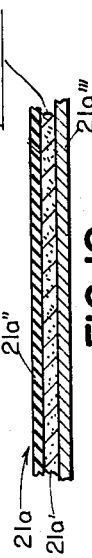
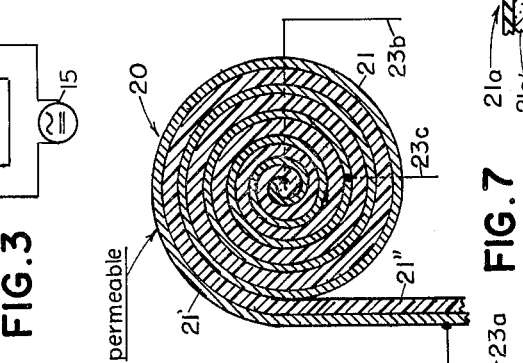
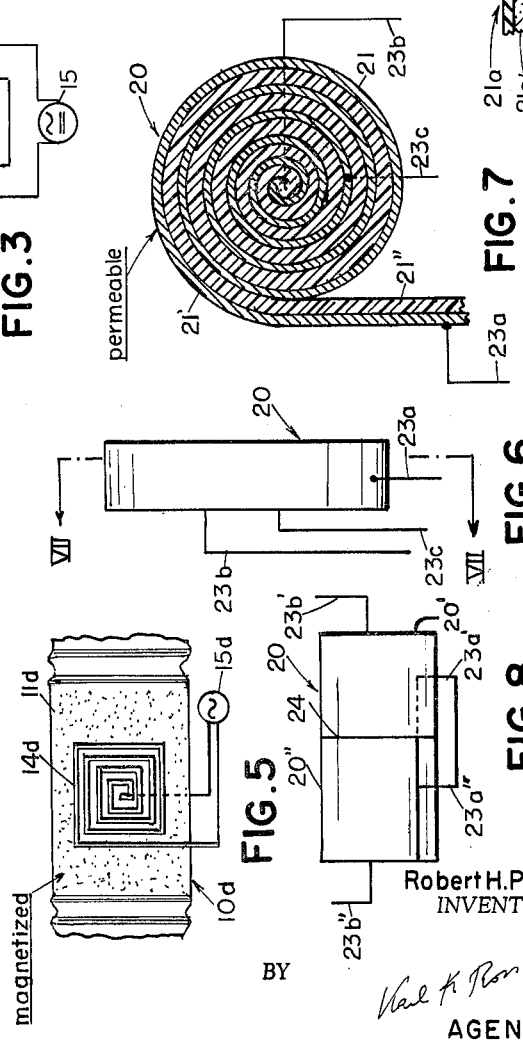
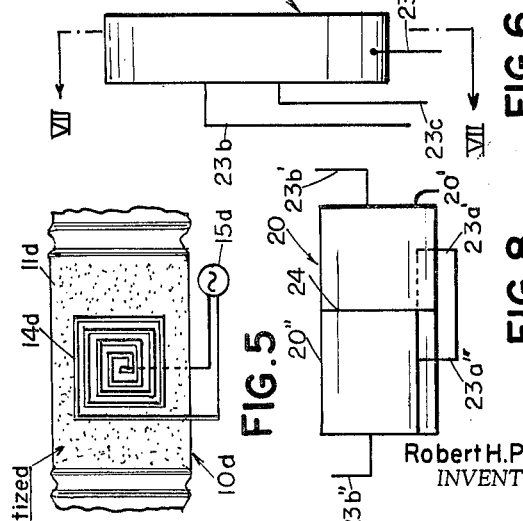
Robert H. Pintell
INVENTOR.
BY
AGENT.

United States Patent Office 3,247,476
Patented Apr. 19, 1966

3,247,476
ELECTROMAGNETIC DEVICE
Robert H. Pintell, New York, N.Y., assignor to Intron International, Inc., Bronx, N.Y., a corporation of New York
Filed June 14, 1961, Ser. No. 117,169
3 Claims. (Cl. 336—177)

My present invention relates to an electromagnetic device adapted to produce a magnetic field of predetermined orientation in response to an electric current flowing therethrough, e.g. for the generation of vibratory motion or for transformer action.

It is an object of my invention to provide an improved device of this type which, in contradistinction to conventional wire coils and similar structures heretofore used for such purposes, is of extremely compact construction with an optimum field distribution and relatively low mass.

It is a more particular object of the invention to provide a loudspeaker diaphragm or other vibratile body of small inertia, capable of operating at elevated frequencies.

It is also an object of my invention to provide an electromagnetic flux generator in which the paths of the magnetic lines of force and of the electric current are closely juxtaposed and interwoven to minimize stray flux and increase the efficiency of the system.

In accordance with the instant invention I provide an elongated conductive element coiled into generally spiral shape, thereby producing an intense flux in a direction normal to the plane of the spiral. The element may be constituted by a coating of suitable conductivity sputtered, plated, painted or otherwise deposited on a nonconductive carrier such as, for example, a flexible membrane; in this case a similar spiral with the same direction of current flow may be formed on the opposite side of the membrane and connected in series with the first spiral to increase the magnetic field.

According to a further feature of my invention I may form the spirally coiled element at least in part of ferromagnetic material to concentrate the magnetic flux therein. In this instance the member advantageously will be in the shape of a flat tape coiled upon itself, with interposition of an insulating layer if this is necessary to prevent the short-circuiting of adjacent turns, so as to serve as both the winding and the core of an electromagnetic device such as an inductance coil. The tape need not be homogeneous but may include two or more layers of, for example, conductive, ferromagnetic and insulating material laminated together. Several coil bodies of this description may be interconnected by curved core segments to form a closed magnetic flux path.

Tapes of the character set forth may be made from commercially available magnetic strip material, e.g. of about 0.02 to 0.5 mm. thickness, and should be cut to such width as to afford the necessary rate of conductance for the current to be passed therethrough. Suitable materials include grain-oriented silicon steel, or nickel-iron alloys (possibly with other metals added) with about 50% to 80%, by weight, of nickel. Several such tapes may, if desired, be insulatedly interleaved to form inductively coupled but galvanically separated circuits. Also, the tape may be tapped at one or more intermediate points of its spiral for connection in an autotransformer circuit. Again, as with the aforedescribed diaphragm, two similarly wound spirals (with the current respectively passing inwardly and outwardly therein) may be juxtaposed and serially interconnected to intensify the magnetic field and to facilitate the attachment of external leads to the coil.

The spiral conductor of my present invention may also by used as the stationary flux generator or control coil of an electromagnetic diaphragm or other vibrator. In the latter instance the controlled element may be a resilient membrane of non-conductive material carrying a layer of "soft" magnetic material (e.g. iron) of high permeability and low residual magnetism, e.g. for use in an electromagnetic system with oppositely poled rectifiers adapted to cause the alternate energization of respective coils as described in my co-pending application Ser. No. 117,170, now Patent No. 3,178,625, filed on even date herewith; the layer may, however, also consist of "hard" magnetic material (e.g. of the ceramic type) permanently magnetized with a predetermined polarity.

The invention will be described in greater detail with reference to the accompanying drawing in which:

FIG. 1 is a front-elevational view of an electromagnetic diaphragm with a spiral coil embodying the invention;

FIG. 2 is a view similar to FIG. 1, showing a modification of the coil;

FIG. 3 illustrates an electromagnetic vibrator incorporating a diaphragm as shown in FIG. 1 or 2;

FIG. 4 is a view similar to FIGS. 1 and 2 of a diaphragm representing a further modication;

FIG. 5 is a side-elevational view of a vibratory system with a field coil generally similar to the diaphragm coil of FIG. 2;

FIG. 6 is a side-elevational view of an electromagnetic coil representing another embodiment of the invention;

FIG. 7 is a cross-sectional view taken on line VII—VII of FIG. 4;

FIG. 8 is a side-elevational view of a compound coil of the general character shown in FIGS. 6 and 7;

FIG. 9 illustrates a transformer incorporating two compound coils similar to those shown in FIG. 8; and FIG. 10 is a cross-sectional view of a composite strip adapted to be used in a coil of the type shown in FIG. 8 or 9.

In FIG. 1 I show a vibratile diaphragm 10a, e.g. for electro-acoustic transducers, comprising an oscillatable membrane 11a of paper, synthetic plastic or other nonconductive sheet material and a pair of conductive elements 12a', 12a" carried on opposite faces thereof. The elements 12a', 12a" are metal strips of spiral configuration plated, sprayed or otherwise deposited onto respective faces of membrane 11a and serially interconnected, at the center of the membrane, in such manner that their magnetic fields have the same orientation and thus reinforce each other when a source of direct or alternating electric current is connected across their external terminal leads 13a', 13a".

The diaphragm 10b of FIG. 2 is generally similar to diaphragm 10a but has only a single spiral 12b on the front face of its membrane 11b; the return conductor on the rear face leads straight into terminal lead 13b" from the center of spiral 12b whose outer turn is joined to lead 13b'. Spiral 12b is shown provided with generally rectangular turns in lieu of the round turns of spirals 12a', 12a".

FIG. 3 illustrates how a diaphragm 10, which may be of the type shown in either of the preceding figures, is oscillatably suspended between a pair of electromagnets 14', 14" having their cores aligned with the axis of the coiled conductor not visible in FIG. 3; these cores may have their outer faces interconnected in conventional manner by a ferromagnetic yoke not shown. The windings of magnets 14', 14" are serially connected across a source 15 for energization in aiding relationship, whereas terminal leads 13', 13" are tied to another source 16 for supplying current to the spiral or spirals of the diaphragm 10. Opposite sides of the diaphragm membrane are shown formed into accordion pleats 11', 11" adjacent fixed supports 17', 17" to provide the necessary vibratile suspension. It will be apparent that the diaphragm will be set in oscillatory motion if either source 15 or 16 has an alternating output while the other produces a direct current, as indicated diagrammatically in FIG. 3; also, if one of the sources generates direct current while the other is replaced by a load, the latter will be traversed by secondary current if the diaphragm is subjected to mechanical vibrations. Thus, the system of FIG. 3 can be used either as a transmitter or as a receiver of acoustic, supersonic or similar waves. Also, electromagnets 14', 14" could be replaced by permanent magnets if source 16 is an A.-C. generator or if a load responsive to induced currents is substituted therefor.

FIG. 4 depicts a further diaphragm 10c with a vibratile membrane 11c and a plurality of spirals 12c', 12c", 12c''' serially connected between terminal leads 13c' and 13c", the sense of connection being again such as to result in a like direction of magnetization for the several spirals upon the connection of a source of current across these leads. Membrane 11c is again shown pleated at 11c', 11c" for increased mobility relative to its supports 17c', 17c". Diaphragm 10c may thus be juxtaposed with a series of permanent or electromagnetic magnets or magnet pairs, respectively aligned with its spirals 12c', 12c", 12c''', in the manner described in connection with FIG. 3.

FIG. 5 shows a reversal of the systems heretofore described in that a field coil 14d of spiral configuration, energizable from an A.-C. generator 15d, is juxtaposed with a diaphragm 10d having a marginally accordion-pleated membrane 11d with a layer of permanently magnetized particles deposited on at least one of its faces. These particles, which may be of ceramic material (ferrites) or metallic (e.g. steel), are polarized in a direction parallel to the axis of coil 14d so as to be alternately attracted and repelled by the field due to the current from source 15d. Insulating spacers may hold the turns of the coil 14d separated so as to maintain voids therebetween for the unhindered passage of air currents set in motion by the vibrating diaphragm. If desired, a pair of such coils may be disposed in series-aiding relationship on opposite sides of the membrane 11d in the manner illustrated in FIG. 3 for the magnets 14' and 14"; also, generator 15d may again be replaced by a detector of alternating currents if the system is to act as a receiver of acoustic or other mechanical vibrations.

In FIGS. 6 and 7 I have illustrated a coil 20 composed of a spirally wound flat tape 21 which consists of two laminated strips 21' and 21". Strip 21' is made of magnetically permeable, electrically conductive material such as iron or a ferrous alloy, its width being sufficient to afford the necessary degree of conductivity for an electric current passing from a suitable source (not shown) through the coil via external terminal lead 23a and internal terminal lead 23b. Strip 21" consists of dielectric material, e.g. polystyrene. An intermediate tap on strip 21' is connected to a further lead 23c. The turns of tape 21 may be adhesively bonded together to preserve the cylindrical shape of the body of coil 20.

The coil 20 produces a steady or alternating magnetic field (depending upon the nature of the traversing current) oriented in the direction of the cylinder axis of its body. If alternating current is supplied to two of the leads, a stepped-up or stepped-down secondary voltage will be available between one of these leads and the third lead whereby the coil acts as an autotransformer. The number of intermediate taps and terminal leads may, of course, be increased; similarly, two or more spiral tapes such as tape 21 may be insulatedly interleaved or juxtaposed to act as galvanically separate transformer windings.

FIG. 8 shows the juxtaposition of two coils 20' and 20", each similar to coil 20 of FIGS. 6 and 7, which have been wound in relatively inverse directions as shown for the spiral conductors 12a' and 12a" in FIG. 1. A thin insulating layer 24 separates the tapes of the two coils from each other. Outer terminal leads 23a' and 23a" have been interconnected so that the flux through the coils will be in aiding relationship when they are serially energized by a source of current connected across their respective inner terminal leads 23b', 23b".

In FIG. 9 I provide two coil bodies 120 and 220, each of the same general character as the one shown in FIG. 8. The components 120', 120" and 220', 220" of each body are, however, interconnected by their inner terminal leads 123a, 223a which are shown encased in respective insulating layers 124, 224 of highly permeable material, such as ferrite. Two permeable core pieces 25' and 25", of C-shaped configuration, engage opposite cylinder faces of the two coil bodies to complete a closed path for magnetic flux; these core pieces may be adhesively secured to the coils by an insulating cement, or with interposition of a dielectric layer similar to layer 24 in FIG. 8, to provide galvanic separation between all the coils. A source 26 of alternating current is shown connected across the free terminal leads of coil body 120, the corresponding leads of body 220 being connected across a load 27. It will be readily apparent that the system of FIG. 9 may be used as a transformer (as illustrated), as a saturable-core reactor (e.g. with lead 27 replaced by a suitable source of biasing current), or for related purposes. In each case bodies 120, 220 of electrically conductive and magnetically permeable strip material will be the site of an electromagnetic field, alternating at the frequency of source 26, whose magnetic lines of force are strongly concentrated in the turns of the spiral strips so that stray fields will be minimized.

FIG. 10 illustrates how a tape 21a, adapted to be used in any of the coil bodies of FIGS. 6–9 in lieu of tape 21, may be composed of a permeable central layer 21a', a dielectric outer layer 21a" and a highly conductive opposite outer layer 21a''' (e.g. of copper) for improved performance due to reduced ohmic resistance. On the other hand, I have found that strips of magnetizable alloys will, after annealing, have an outer surface of such low conductivity that a separate insulating layer alongside the magnetic layer may be omitted in many instances, the coil then consisting of a homogeneous tape.

It will be apparent that in the system of FIG. 4, for example, the connections between the individual spirals (or their juxtaposed field magnets) may be reversed to provide higher modes of vibration for more faithful response to higher frequencies (e.g. with coil 12c" vibrating in phase opposition to coils 12c', 12c'''), that the membranes of the several diaphragms shown in the drawing may be perforated between turns of their spirals to provide air passages as described in connection with FIG. 5, and that other modifications and combinations of features herein disclosed may be utilized without departing from the spirit and scope of the invention as defined in the appended claims.

I claim:

1. An electromagnetic transformer comprising two generally cylindrical solid bodies with axially spaced-apart end faces, each of said bodies being composed substantially in its entirety of a spiral strip having turns centered on the cylinder axis and extending outwardly from the vicinity of said axis, said strip consisting substantially throughout its length of a material which is at least in part magnetizable and at least in part conductive, each of said turns having a high-resistance surface portion whereby adjacent turns are substantially insulated electrically from one another; two ferromagnetic cores each extending from a respective end face of one of said bodies to a corresponding end face of the other body and complementing said bodies in forming therewith a substantially closed magnetic-flux path; first conductor means on one of said bodies for connecting at least a portion of its said strip across an alternating-current source; and second conductor means on the other of said bodies for connecting at least a portion of its said strip across a load.

2. A transformer according to claim 1 wherein said cores are substantially C-shaped, the ends of the C contacting the faces of said bodies.

3. A transformer according to claim 2 wherein said cores are composed of laminations extending from one end of the C to the other.

References Cited by the Examiner

UNITED STATES PATENTS

| | | | |
|---|---|---|---|
| 426,153 | 4/1890 | Wagemann | 336—177 |
| 512,340 | 1/1894 | Tesla | 336—232 |
| 1,595,838 | 8/1926 | Turner | 336—232 |
| 2,658,113 | 11/1953 | Holmes | 336—212 X |
| 2,695,387 | 11/1954 | Clark | 336—212 X |
| 2,716,736 | 8/1955 | Rex | 336—177 X |
| 2,843,829 | 7/1958 | Slate | 336—232 |
| 2,850,707 | 9/1958 | Wroblewski et al. | 336—232 |
| 3,086,184 | 4/1963 | Nichols | 336—192 |

FOREIGN PATENTS 441,375  3/1927  Germany.

JOHN F. BURNS, *Primary Examiner.*